United States Patent [19]

Meyers et al.

[11] Patent Number: 4,589,313

[45] Date of Patent: May 20, 1986

[54] AUTOMATIC SHADE CUTTER

[75] Inventors: Frederick C. Meyers, Hinsdale; David B. Mann, Clarendon Hills, both of Ill.

[73] Assignee: Joanna Western Mills Company, Chicago, Ill.

[21] Appl. No.: 739,606

[22] Filed: May 30, 1985

[51] Int. Cl.[4] .......... B23B 3/26; B23B 5/14

[52] U.S. Cl. .......... 82/63; 82/48; 82/70.2; 82/92; 82/99 A

[58] Field of Search .......... 82/46–48, 82/52, 59, 60, 63, 70.2, 92, 101, 2 E, 20, 99 A, 83, 84

[56] References Cited

U.S. PATENT DOCUMENTS

| | | | |
|---|---|---|---|
| 1,214,575 | 2/1917 | Miller | 82/101 |
| 1,964,984 | 5/1932 | Gast . | |
| 2,326,293 | 8/1943 | Gast | 82/101 |
| 2,326,463 | 8/1943 | Johnston . | |
| 2,481,446 | 9/1949 | Quijada . | |
| 2,521,004 | 9/1950 | Gitter . | |
| 2,888,048 | 5/1959 | Gast et al. . | |
| 3,064,452 | 11/1962 | Gast, Jr. . | |
| 3,107,564 | 10/1963 | Colser et al. | 82/101 |
| 3,129,621 | 4/1964 | Makowski | 82/59 |
| 3,159,071 | 12/1964 | Bateman | 82/101 |
| 3,494,230 | 2/1970 | Gast, Jr. | 82/101 |
| 3,715,940 | 2/1973 | Davis | 82/63 |
| 3,760,664 | 9/1973 | Gossling | 82/63 |
| 3,771,393 | 11/1973 | Gatto et al. | 82/53.1 |
| 3,933,347 | 1/1976 | Stoffels | 82/101 |
| 4,172,399 | 10/1979 | Hillesheimer | 82/101 |

FOREIGN PATENT DOCUMENTS

| | | |
|---|---|---|
| 100560 | 3/1937 | Australia . |
| 731442 | 4/1966 | Canada . |
| 402079 | 9/1924 | Fed. Rep. of Germany . |

OTHER PUBLICATIONS

Operating Instructions for Star Electric (date unknown) Window Shade Cutter, Star Shade Cutter Co., Michigan.

*Primary Examiner*—Francis S. Husar
*Assistant Examiner*—Jerry Kearns
*Attorney, Agent, or Firm*—Mason, Kolehmainen, Rathburn & Wyss

[57] ABSTRACT

An automatic shade cutter for cutting stock width shades to a particular width includes a clamping system for securing the shade in a selected cutting position on a longitudinal axis and a measuring scale positioned for use in selecting the desired width. The apparatus includes a cutting head rotatable about the longitudinal axis of the shade having a rotatable, circular knife movable into and out of cutting engagement on a plane normal to the axis of the shade. An indexing system is provided to insure that substantially all of the cutting edge of the knife is utilized and that successive cuts are accomplished beginning at random points along the knife edge thus increasing the life of the knife edge between sharpenings. The automatic shade cutter is designed for use in retail stores for operation by retail customers. A customer first selects a stock shade and then inserts the shade into a measured cutting position in the machine. Thereafter, an automatic cutoff operation is initiated by merely pushing a button and when the cutting operation is completed, the shade is removed and an end plug or pivot is inserted in the freshly cut end and a hem slat of appropriate length is inserted into the hem along the lower edge of the shade.

10 Claims, 8 Drawing Figures

FIG. 1
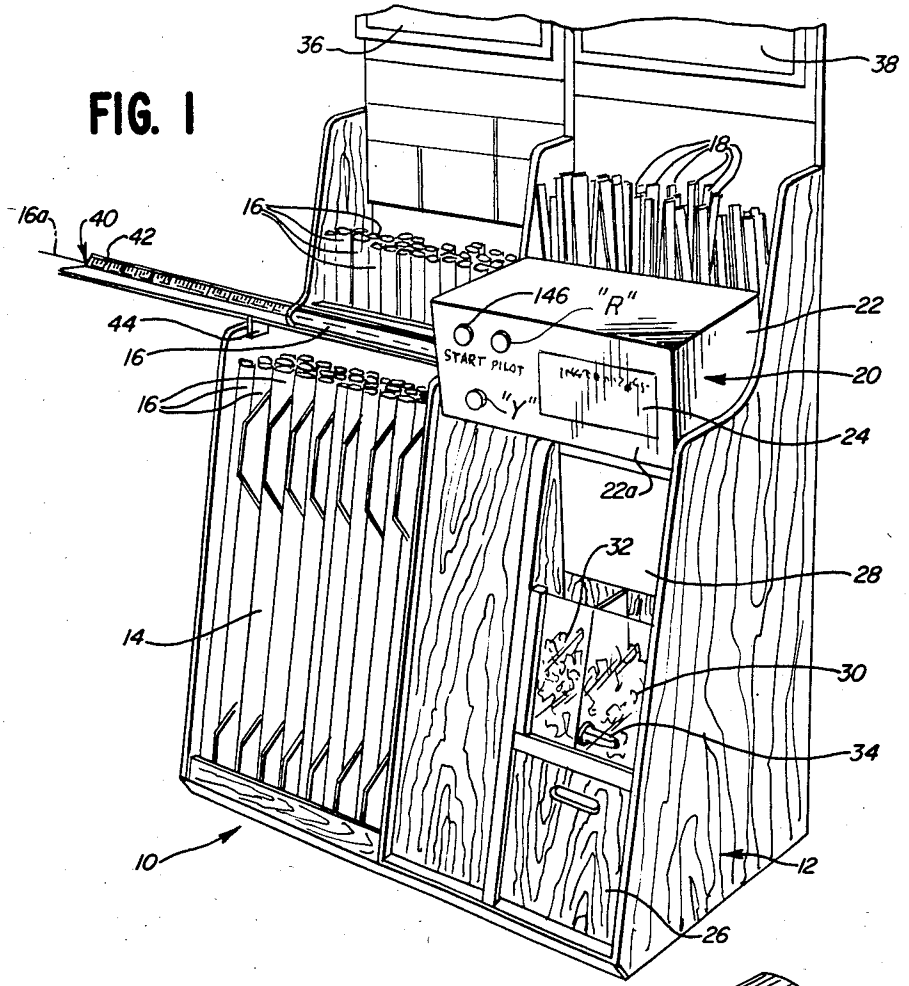
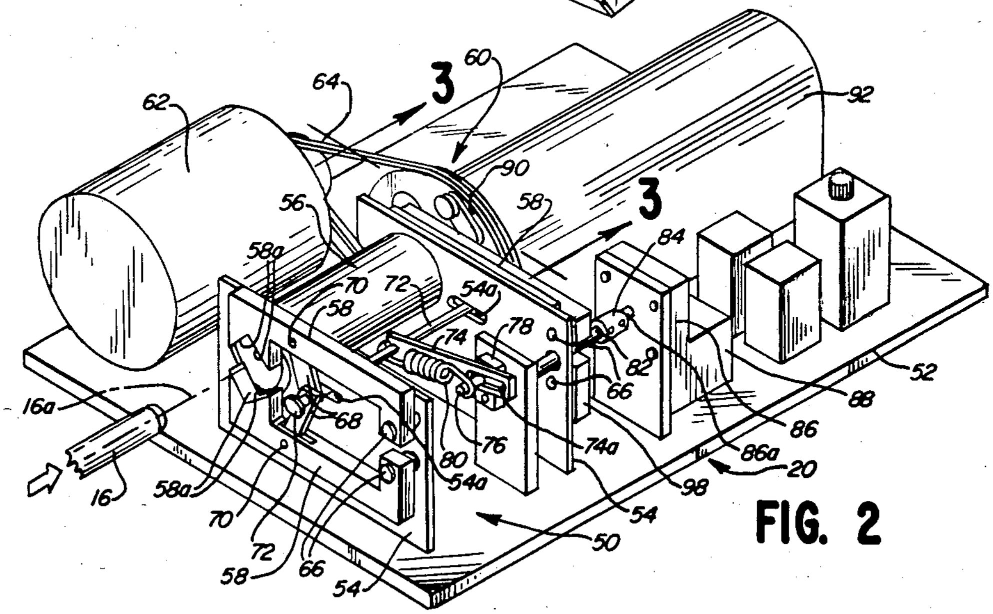
FIG. 2

AUTOMATIC SHADE CUTTER

BACKGROUND OF THE INVENTION

A. Field of the Invention

The present invention relates to a new and improved automatic shade cutter and more particularly to an automatic shade cutter designed for use in retail establishments for operation by a customer without the need for a clerk or other store personnel. The customer first selects a stock shade and inserts the shade into a measured cutting position in the machine for cut-off to a particular width in accordance with the customer's requirement. The present application is an improvement on the automatic shade cutter shown and described in the copending U.S. patent application Ser. No. 582,463, filed Feb. 22, 1984 and assigned to the same assignee as the present application. The automatic shade cutter provides a safe, reliable and automatic system for accurately cutting shades to width and eliminates the need for a retail clerk or other personnel to be available for cutting a shade to a customer's required width.

B. Description of the Prior Art

Over the years, a wide variety of solutions have been proposed and tested in order to deal with the problem of sizing a window shade to a particular width. A "Star" shade cutter, manufactured and sold by Star Shade Cutter Company of St. Joseph, Mich., is commonly found in many retail establishments that sell window shades. The "Star" cutter is a lathe-like apparatus and a certain degree of skill is required. "Star" shade cutters are generally not suitable for use by retail customers alone without aid from store personnel because of exposed rotating parts and cutting mechanisms.

U.S. Pat. Nos. 1,214,575; 1,964,984; 2,326,463; 2,326,293; 2,481,446; 2,521,004; 2,888,048; 3,064,452; 3,100,649; 3,107,564; 3,129,621; 3,159,071; 3,494,230; 3,679,109 3,715,940; 3,760,664; and 3,771,393; 3,933,347; and 4,172,399 relate to various types of window shade cutters and devices for trimming elongated articles to selected widths. In addition, Canadian Pat. No. 731,442; German Pat. No. 402079 and Australian Pat. No. 100560 relate to cutting mechanisms for trimming various types of material to width.

The problem of sizing window shades to a particular width has also been addressed by providing shades having prescored lines in the shade fabric to facilitate manual tearing or peeling away an edge portion to leave the remaining portion at a desired width. U.S. Pat. Nos. 4,006,770; 4,102,383; 4,102,384; 4,102,385 relate to this type of product.

U.S. Pat. No. 4,157,108 discloses a shade roller with a plurality of severable ring elements which may be removed as desired to provide a shade roll of desired width and U.S. Pat. No. 4,139,043 discloses a window shade hem slat which can be broken off along lines of weakness to a desired width in order to fit a particular width of shade.

In more recent years, shade rollers have been formed of convolute, paper stock tubes rather than wood dowels and a wide variety of removable end plugs or terminals have been developed, for example, such as those shown in U.S. Pat. Nos. 3,362,461 and 3,340,922.

OBJECTS OF THE INVENTION

It is an object of the present invention to provide a new and improved automatic shade cutter and more particularly an automatic shade cutter for use in retail establishments wherein a retail customer alone can operate the cutter in a safe and efficient manner to cut a shade to a particular width.

Yet another object of the present invention is to provide a new and improved automatic shade cutter of the character described which does not require the presence of a retail clerk or other store personnel for service or supervision of a retail customer when cutting a shade to width.

Yet another object of the present invention is to provide a new and improved window shade system wherein a stock shade may be accurately cut to a desired width automatically in a safe efficient and fast manner.

Yet another object of the present invention is to provide a new and improved automatic shade cutter which is safe, reliable and accurate in operation for providing "cut-to-width" stock shades for retail customers.

Yet another object of the invention is to provide a new and improved automatic cutter head for cutting stock width shades to a particular size.

Another object of the invention is to provide a new and improved method of making a window shade of a particular width and more particularly, a method of providing a cut-to-width shade of a selected width.

It is an object of the present invention to provide a new and improved automatic shade cutter of the character described including a hollow cutter head with a circular knife rotatable around a rolled-up shade that is clamped in a cutting position and including an indexing system for insuring that substantially all of the knife edge is utilized as successive cuts are accomplished.

More particularly, it is an object of the present invention to provide a new and improved automatic shade cutter of the character described in the preceding object having an indexing system that provides for successive cuts to begin at randomly points along the edge of the knife thereby increasing the life of the knife edge.

Yet another object of the present invention is to provide a new and improved automatic shade cutter of the character described including control circuit means for sensing the presence of a shade in a cutting position in the apparatus to enable an automatic cycle of operation to be commenced.

Still another object of the present invention is to provide a new and improved automatic shade cutter including a control circuit of the character described which provides an automatically controlled operational cycle including sequential steps of clamping a shade in cutting position, energizing a cutting head to effect a cut, deenergizing the cutting head whewn the cut is completed and unclamping the shade to permit manual withdrawal thereof.

BRIEF SUMMARY OF THE INVENTION

The foregoing and other objects and advantages of the present invention are accomplished in a new and improved automatic shade cutter for cutting stock width window shades to a particular size as required by a retail customer. The automatic cutter includes a clamping system for securing a rolled-up shade in a cutting position along a longitudinal axis and a measuring scale is provided so that a retail customer may accurately position the window shade by inserting the end to be cut off into the machine with the outer end aligned at a desired mark or width on the scale. Upon insertion of a shade into a selected cutting position in the machine, a presence sensor is activated so that thereafter by pressing a start button, an automatic operating cycle is commenced wherein the clamping system is activated to clamp the shade firmly in cutting position, followed by a cutting head being energized to rotate about an axis of the shade. The cutting head includes a circular knife which moves inwardly on a plane normal to the axis of the shade to engage and cut the shade material and roller. After the cut-off is complete, the cutting head is deenergized and the knife retracts outwardly as the cutting head stops rotation.

An automatic indexing system is provided for controlling the circular knife to permit rotation thereof only in one direction relative to the cutting head and restrain rotation thereof in an opposite direction. The uni-directional rotation controlinsures that substantially all of the circular cutting edge of the knife is utilized and that successive cuts begin at randomly different points on the circumference of the knife edge, thus insuring a long and useful life between knife sharpenings. A sensor is provided to automatically deenergize the cutting head as soon as the cut off is completed and thereafter open the clamping system so that the accurately "cut-to-width" stock shade may be withdrawn from the machine. An end or terminal plug for pivotal support of the shade is inserted into the cut-off end and a hem slat matching the width of the shade is provided for insertion into the hem pocket of the shade.

BRIEF DESCRIPTION OF THE DRAWINGS

For better understanding of the present invention, reference should be had to the following description taken in conjunction with the drawings in which:

FIG. 1 is a front perspective elevational view of a new and improved automatic shade cutting apparatus constructed in accordance with the features of the present invention;

FIG. 2 is a front elevational perspective view of a clamping mechanism and cutting head of the apparatus shown with a protective cover removed;

DESCRIPTION OF A PREFERRED EMBODIMENT

Figure 7:
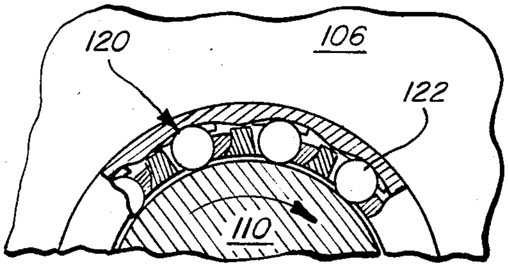
FIG. 7 is an enlarged fragmentary cross-sectional view taken substantially along lines 7—7 of FIG. 6.

Referring now more particularly to the drawings, in FIG. 1 is illustrated a new and improved automatic shade cutter constructed in accordance with the features of the present invention and referred to generally by the reference numeral 10. The automatic shade cutter is especially designed and adapted for use by retail customers in "self-service" or other types of retail establishments selling window shades. For this purpose there is provided an attractive "point-of-sale" cabinet 12 having a storage and display space 14 for a plurality of stock width shades 16 of several different standard widths which are adapted to be cut to a particular width as selected and measured by a retail customer. In addition, the storage cabinet 12 includes a display and storage space for elongated hem slats 18 preferrably of the type shown and described in U.S. Pat. No. 4,139,043. These type of hem slats may be conveniently severed along prescored lines of weakness to a length to match that of the shades after being cut to width.

The cabinet also provides support for a shade cutter assembly 20 (FIG. 2) mounted at a convenient working level and equipped with a rectangular shaped, removable cover or enclosure 22 having a front wall **22*a* and a decal or plate 24 having operating instructions thereon for the retail customer. Below the cutter head assembly a removable drawer-like receptacle 26 is provided for cut-off end portions of the shades. The receptacle is open at the upper end in order to receive the cut-off end portions of the shade dropping downwardly from the cutter assembly through a discharge chute 28** mounted in the cabinet.

Forwardly of the front wall of the chute 28 is provided a pair of storage bins 30 and 32 for containing a supply of end terminals or pivots 34 which may be of the type generally shown in U.S. Pat. No. 3,362,461 and adapted to be inserted into the hollow cut-off end of a shade 16 after cutting to width has been completed.

The cabinet 12 is also provided with an upstanding backwall on which are mounted panels or displays 36 and 38 for providing sales and operating information to a retail customer for the selection of a stock shade of the proper size along with detailed instructions in order to facilitate the use and operation of the automatic shade cutting system in accordance with the present invention.

The automatic shade cutter 10 includes an elongated trough 40 of V-shaped transverse cross section which is adapted to support and guide a stock shade 16 aligned in horizontal position along an axis **16*a* for insertion into the cutter assembly 20 for cutting to width. A measuring scale or rule 42 is fixedly mounted on a side of the trough facing outwardly for easy viewing by the customer to facilitate positioning of the shade along the longitudinal axis into a cutting position ready to be cut to a particular width as measured on the scale. The trough is supported from the cabinet on a pair of upstanding brackets 44 and terminates short of a left hand sidewall of the enclosing cover 22 of the cutter assembly. A short, rounded hood section is provided adjacent the sidewall of the cover to aid in guiding the end portion of a shade 16 which is to be cut to width in the cutter assembly. The cover sidewall is formed with an opening to permit insertion of a shade into the cutter assembly 20 for cut-off, and the opening is in general coaxial alignment with the V-shaped trough 40 and the axis 16*a***.

Stock width shades of a type including a convolute paper shade roll with a shade motor at one end and a tightly wrapped shade cloth enclosed in a tightly wrapped plastic cover are provided and a retail customer initially selects a stock width shade of the proper width to be cut-off to a shorter measured width. The opposite end portion of the selected shade is then inserted into the opening of the cover and the outer or motor end of the shade is aligned with a selected mark on the scale 42 of the V-shaped trough 40. Each mark or scale gradation represents the width of the shade after a cut-off operation is completed. When the shade is in a cutting position ready for cutting to the width as measured on the scale, the clamping and cut off operation is initiated. A clean and accurate cut-off of the external wrapping material (if not removed), the convolute paper shade roll tube and the shade material is effected on a cutting plane normal to the elongated axis 16a of a shade aligned on the V-shaped trough.

The cutter assembly 20 includes a clamping assembly 50 for securely holding a shade 16 in a selected-cut-off position during a cut-off operation and includes a rotating cutter head 60 driven by an electric motor 62 for effecting the cut. The cutter head is driven by an endless V-belt 64 to rotate at approximately 600 RPM.

As shown in FIG. 2, the cutter assembly includes a large rectangular base plate 52 for supporting a pair of upstanding, parallel brackets 54. The brackets 54 are perpendicular to and spaced longitudinally apart along the axis 16a (FIG. 2) and are secured to one another by appropriate structural elements which may include a hollow tubular element 56 in coaxial alignment around the shade axis 16a and/or other interconnecting members.

Each bracket provides support for an upper and a lower clamping jaw 58 and each jaw is mounted for pivotal movement on a pivot axle 66 as shown in FIG. 2. Each clamping jaw includes a V-shaped clamping surface 58a adapted to contact and tangentially grip a shade. Each pair of upper and lower jaws move in unison to accurately center a shade to be cut in coaxial alignment along the axis 16a while the cut-off operation takes place. Depending upon the size of the shade selected, the outer diameter may vary somewhat and this variation is readily accommodated by each pair of cooperating jaws 58 which move toward and away from one another in unison and closely center the shade on the preferred cutting axis 16a. In addition the shade is clamped at longitudinally spaced apart positions thereon adjacent the end portion to be cut off and is thus firmly secured during the cutting operation.

The jaws 58 are pivotal about their respective mounting pins 66 and are moved between a shade clamping position wherein the V-shaped clamping surfaces 58a are in holding engagement with a shade and a release position spaced far enough radially outwardly of the axis 16a to disengage the surfaces 58a of the upper jaws from clamping contact with the shade. After the cut-off is complete and the jaws are moved to a release position, the cut-off shade can be removed from the machine by longitudinal withdrawal from the cutting assembly in an outward direction. Normally, the clamping jaws 58 are at rest in the outer or release position until being actuated to clamp and hold a shade in cutting position while a cut is being completed.

Movement of each pair of clamping jaws 58 between a clamping and a release position is controlled by pairs of toggle link members 68 pivotally secured to the respective jaws with pins 70. Each pair of toggle links is pivotally interconnected together by a common pin or actuating bar 72. The elongated actuating bar is parallel of the shade axis 16a on a common horizontal plane therewith and is moveable toward and away from the shade axis 16a to open and close the clamping jaws. The bar is guided for horizontal movement in a pair of horizontal slots 54a formed in the support brackets 54 to ensure coplanar movement of the bar with respect to the longitudinal axis of a shade in cutting position.

When the jaw actuating bar 72 is moved and positioned toward the inner end of the slots 54a that are closest to the shade axis 16a, the clamping jaw surfaces 58a are spread far apart to release the shade, whereas, when the bar 72 is moved and positioned toward the opposite or outer ends of the slots 54a, the clamping surfaces of the jaws are moved into a shade clamping position. Movement of the bar 72 is controlled by a connecting member 74 having an elongated slot 74a for driving engagement with a rotating crank pin 76 carried adjacent an outer end portion of a crank arm 78.

The connector 74 is attached to the jaw control bar 72 midway between opposite ends thereof so that the bar tends to move in parallelism with the shade axis 16a as the jaws are moved between clamping and release positions. A coil spring 80 is interconnected between the bar 72 and the crank pin 76 to continually bias the bar toward the crank pin and thus resiliently bias the jaw clamping surfaces 58a against a shade 16 while in cutting position. In this manner, shades of varying outer diameters can be handled without adjustment of the clamping members or linkage and, even though stock shades of different outer diameters are cut, each shade is maintained in substantial coaxial alignment with the common axis 16a regardless of the size. The slot 74a of the connector link provides a lost motion function so that the bias spring is effective to resiliently urge the clamps to engage shades of different outer diameters.

The crank arm 78 is mounted adjacent to the end of a motor driven crank axle 82 which is connected at an opposite end through a coupling 84 to the output shaft 86a of a gear reducer 86 driven by an electrically powered motor 88. The motor is energized periodically to turn the crank arm 78 in increments of one-half a revolution or 180°. When the crank arm is pointed directly toward the bar 72 the clamping jaws are moved to the shade release position and when the arm is pointed directly away from the bar 72, the clamping jaws 58 move into the clamping position to secure the shade while the cut-off is made. Both pairs of clamping jaws 58 move together and because the jaws are spaced apart longitudinally of the shade, the shade is firmly supported while the cut is made near the plane of the cut.

Figure 3:
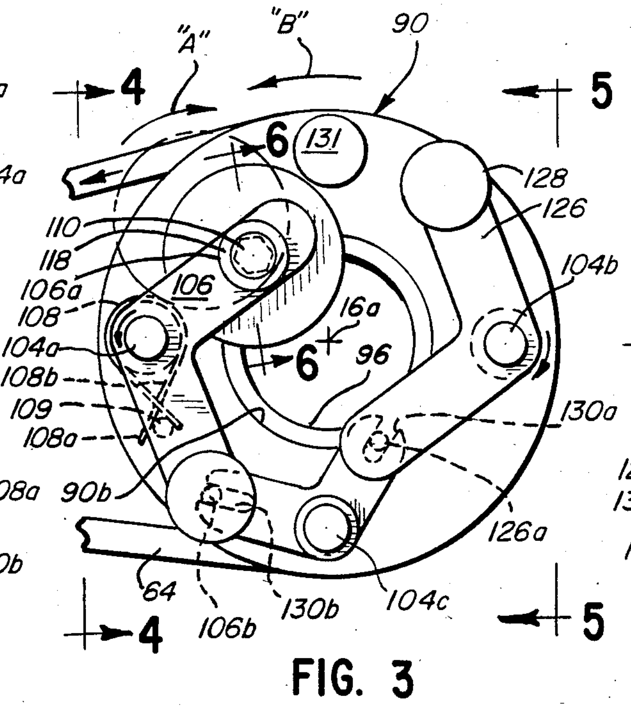
FIG. 3 is a transverse cross sectional view taken substantially along lines 3—3 of FIG. 2.

In accordance with an important aspect of the invention, the cutter head 60 includes a circular base 90 having a V-groove 90a in the outer edge for receiving the endless drive belt 64. As shown in FIG. 3, the annular base is formed with a central opening 90b in coaxial alignment with the axis 16a in order to permit an end portion of a shade to be extended through the opening into a cut-off area. The cut-off area is enclosed by a hood or cover 92 directly above the upper end of the discharge chute 28 which leads to the removable receptacle 26. After a cut is completed, the cut-off portion falls downwardly into the receptacle and the cover 92 insures that the cut-off portion does not fly upwardly or outwardly as the final portion of the cut is completed.

Figure 5:
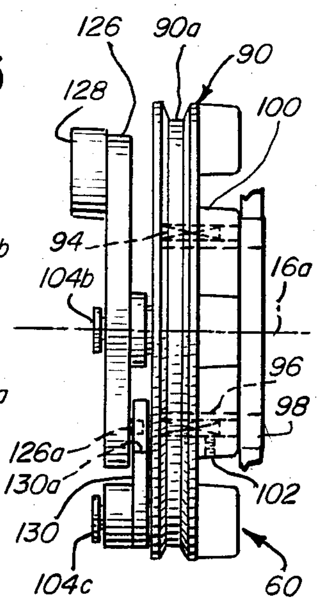
FIG. 5 is a side elevational view looking in the direction of arrows 5—5 of FIG. 3.

The annular cutter base 90 is supported for rotation about the shade axis 16a on a bearing ring 94 (FIG. 5) mounted on a circular sleeve support 96. The sleeve projects from the outer face of a vertical bracket 98 secured to the base plate 52 in spaced parallel relation to the brackets 54. A concentric sleeve 100 is provided on the outer face of the cutter base 90 and is attached to the outer race of the bearing ring 94 with set screws 102 which are also used to secure the inner race of the bearing ring to the sleeve support 96.

Figure 6:
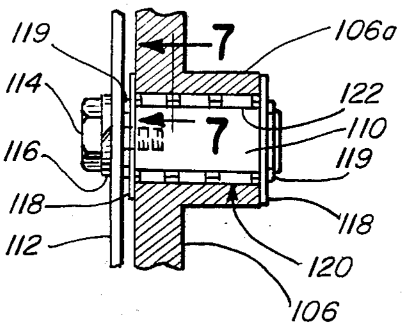
FIG. 6 is a fragmentary cross-sectional view taken substantially along lines 6—6 of FIG. 3.
Figure 4:
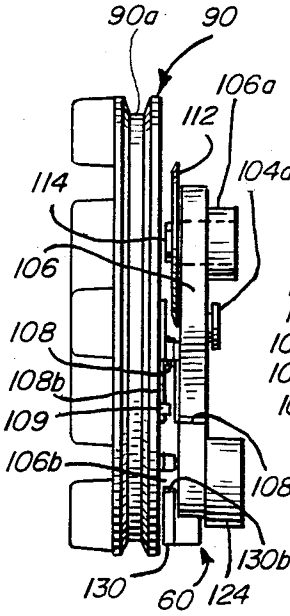
FIG. 4 is a side elevational view looking in the direction of arrow 4—4 of FIG. 3.

As viewed in FIG. 3, the cutter head assembly 60 includes a plurality of arm support pins 104a, 104b, and 104c projecting outwardly from the inside planar face of the base 90 towards the shade clamping arms 58. A generally L-shaped support arm 106 is pivotally supported on the pin 104a at an apex thereof intermediate the opposite ends of the arm, and the arm is biased in a counterclockwise direction by a coil spring 108 having a leg or tang 108*a* at one end engaging an outer surface of the arm 106 below the mounting pin 104*a* and an opposite end or tang 108*b* engaging a short pin 109 mounted on the cutter base 90. The knife supporting arm 106 is provided with a cylindrical boss 106*a* adjacent an upper end portion and a cutter knife supporting shaft or spindle 110 is mounted for rotation in a generally cylindrical bore of the boss. A circular cutting knife 112 is secured to rotate with the shaft 110 at an inner end by an axial cap screw 114 and a lock washer 116 as shown in FIG. 6. The spindle is retained within the boss 106*a* by a pair of retaining washers 118 and C-rings 119 engaged in circumferential slots provided in the spindle closely adjacent the ends.

In accordance with the present invention, the cutter assembly head 60 includes an automatic indexing system for the circular cutter knife 112 to permit rotation of the knife only in a clockwise direction as indicated by the arrow "A" in FIGS. 3 and 7 and the system acts to restrain or limit rotation of the knife and spindle in an opposite, counter-clockwise direction. The restraining action is achieved by means of an overrunning clutch assembly 120 mounted within the bore of the boss 106*a* and surrounding the knife supporting shaft or spindle 110. Preferably the overrunning clutch is of a type made by the Torington Company, Bearings Division, in Torington Conn. such as a series RC or RCB. This type of overrunning clutch is commercially available and is generally described and referred to as a Torington drawn cup precision roller clutch.

The clutch includes a plurality of rollers retained in position by retainer springs and includes an outer race having a plurality of individual wedging ramps which lock the spindle 110 and boss 106*a* together against relative rotation when rotation of the spindle in a counter-clockwise direction is attempted. The ramps permit free overrunning rotation of the shaft or spindle 110 in a clockwise direction within the bore of the boss 106*a*.

As viewed in FIG. 3 the cutter head base 90 is driven by the endless belt 64 whenever the motor 62 is energized to rotate in a counter-clockwise direction as indicated by the arrow "B". When the cutter head is at rest, the circular knife 112 is in an outward position as indicated by dotted lines and the sharp circumferential edge of the cutter knife is spaced outwardly far enough with respect to the central axis 16*a* so that a shade 16 may be freely inserted into and through the central opening 90*b* along the elongated shade axis to a selected, measured position ready for cut off. Bias spring 108 normally maintains the circular knife 112 in the outer or non-cutting position whenever the cutter head base 90 is not rotating and at this time after disengages from a cut, the overruning clutch assembly 120 prevents rotation of the knife 112 in a counter-clockwise direction. The clutch freely permits knife rotation in a clockwise direction as each new cycle of cutting operation is commenced and the knife edge moves in to cut off a shade.

At an opposite or lower end as viewed in FIG. 3, the knife supporting arm 106 is provided with a fly weight 124 which is sensitive to centrifugal force when the cutter base 90 begins to rotate as indicated by the arrow "B". As rotation commences, the flyweight 124 tends to move outwardly and this force on the lever 106 overcomes the bias of the spring 108 to move the circular, cutter knife 112 into cutting engagement with a shade positioned along the axis 16*a*. Frictional forces tend to rotate the knife as cutting engagement takes place, and the clutch 120 permits free rotation in the clockwise direction as shown by the arrow "A".

Substantially the entire circumference of the knife edge is used in making a cut so that generally uniform wear is achieved resulting in a long life for the sharpened knife edge between sharpenings or replacement.

As soon as the cut off is completed and the motor 62 is deenergized to discontinue driving rotation of the cutter head base 90, the circular knife 112 moves outwardly away from contact with the shade as the bias spring 108 overcomes the reducing centrifugal force acting on the flyweight 124. As cutting contact is broken, the circular knife 112 is restrained against rotation in a counterclockwise direction by the overruning clutch assembly 120 and the next cycle of cutting engagement commences at a random position along the knife edge but in a forward, clockwise advanced position relative to the point on the knife edge at which the last cutting contact was made on the previous cut off cycle. The overruning clutch assembly 120 thus acts as an automatic indexing system for the circular cutting knife 112 to insure long knife edge life and to prevent uneven wear of the knife edge at particular points around the circumference thereof.

In order to balance the cutter head assembly 60 and to provide an increased force for moving the circular knife 112 inwardly to cut off a shade when the cutter base 90 begins to rotate, the cutter head assembly is provided with an opposite support arm 126 journalled for rotation on the support arm pin 104*b* intermediate its ends. The upper end of the support arm 126 is provided with a counterweight 128 in a position diammetrically opposite to the counterweight 124 on the arm 106, and as the cutter head rotates, the counterweight 128 tends to fly outwardly so that the arm 126 tends to pivot in a clockwise direction about its supporting pin 104*b*.

Lower end portions of the respective arms 106 and 126 are interconnected by a generally L-shaped pivot link 130 supported intermediate its opposite ends on a lower pin 104*c*. An upper end of the pivot link 130 is provided with an elongated open ended slot 130*a* for receiving a guide pin 126*a* provided on the lower end of the arm 126. Similarly the lower end of the pivot link 130 is provided with an open ended slot 130*b* for receiving a pin 106*b* on the lower end of the knife support arm 106. The pin and slot connections between opposite ends of the pivot links 130 and the respective arms 106 and 126 provide for smoothly balanced interconnected pivotal movement between the arms 106 and 126 as the knife moves inwardly to make a cut and outwardly after a cut is completed as the rotation of the cutter head 60 is winding down. A balance weight 131 is provided on the base 90 diametrically opposite the pin 104*c* to help balance the weight of the pin and the pivot link 130.

Figure 8:
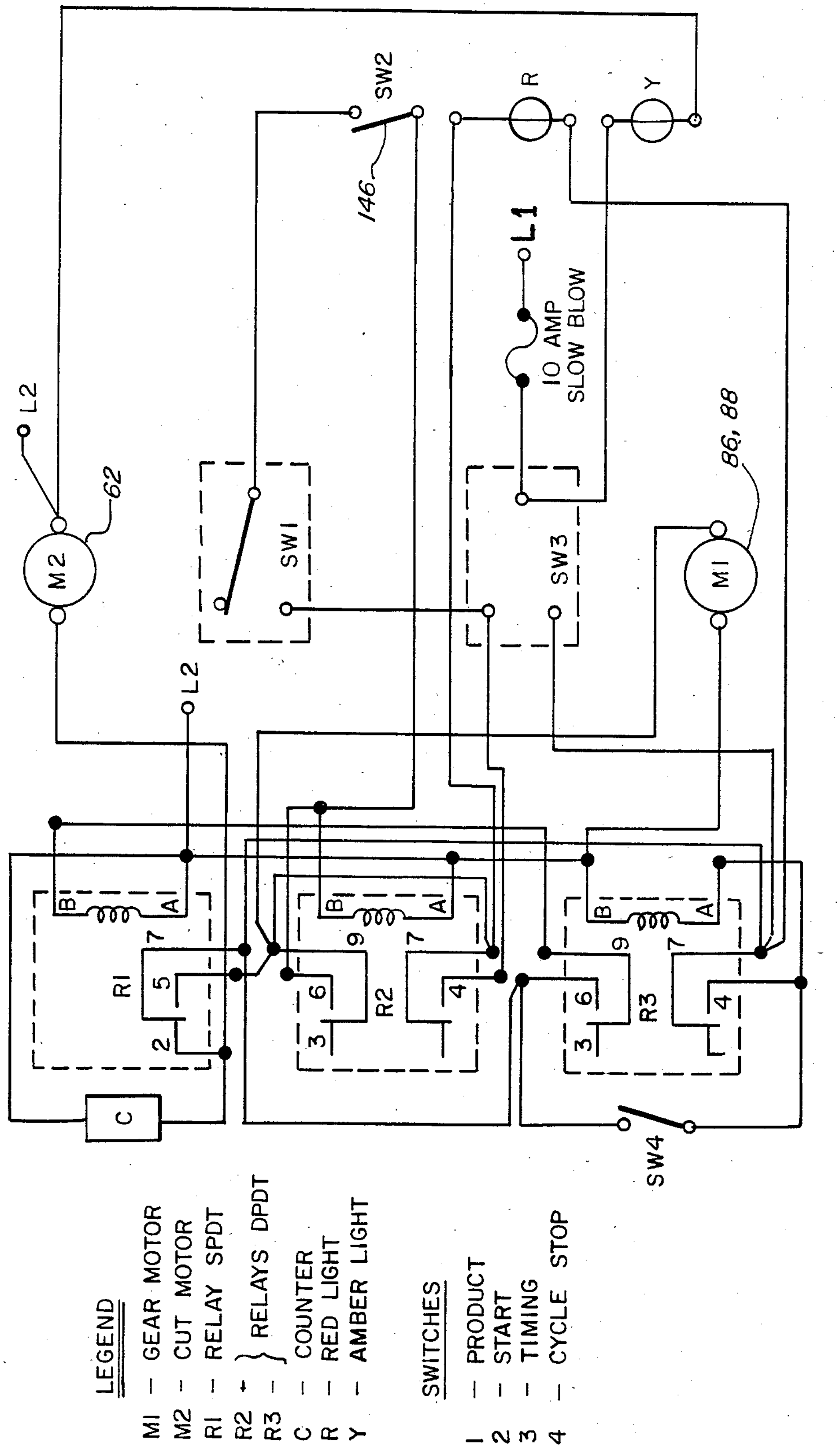
FIG. 8 is an electrical schematic diagram of an electrical circuit of the automatic shade cutting apparatus.

Referring now more particularly to FIG. 8, therein is illustrated a schematic diagram of an operational control circuit for the automatic cut-off operation of the automatic shade cutter 10. The automatic shade cutter is adapted to be powered from a convenience outlet providing a source of 110–120 volt AC power and the AC source or line is labelled with the designations "L1" and "L2" in the diagram of FIG. 8. The removable cover is provided with an amber light labelled "Y" (FIGS. 1 and 8) and the light remains illuminated whenever the cutter is plugged into a 110–120 volt AC power source to energize lines "L1" and "L2". A 10-amp, slow-blow fuse is provided in line "L1" to prevent damage to the components of the circuitry.

In accordance with the present invention, the circuit includes a product presence detector switch "SW1" which comprises a single pole single throw switch actuated by insertion of a shade 16 into cutting position along the axis 16a. Whenever a shade has been inserted, the switch "SW1" is actuated to supply current from the line "L1" to a start switch "SW2" having a momentary contact, push button 146 mounted on the front face of the cover 22 and appropriately labelled "START".

After a customer selects a shade and places the shade in cutting position measured along the scale 42, the start switch "SW2" pushbutton 146 is momentarily depressed and closure of this switch energizes a relay "R2" which in turn starts the gear reducer and motor assembly 86 and 88 (labelled "M1" in FIG. 8) to drive the clamping members 58 toward the shade clamping position wherein the axis of the shade is aligned along the axis 16a and the shade is firmly gripped in position ready for cutting. At this time the relay "R2" becomes self-energized and a red light labelled "R" becomes illuminated. When the gear motor advances the clamping jaws 58 to the shade clamping position, a switch "SW3" is actuated and this switch comprises a single pole double throw switch which moves from the position shown in FIG. 8 to an alternate position for deenergizing the relay "R2" to stop the gear motor "M1". The red light "R" remains on but a blink occurs when the power source for the light is shifted and the cutter motor "M2" is energized to rotate the cutter head assembly 60 to effect a cut-off of the shade as previously described.

After the shade is cut-off, a cut-off switch "SW4" is closed which energizes a relay "R3" and simultaneously energizing a relay "R1". Relay "R2" becomes self-energized also at this time. The cutter motor "M2" ceases to rotate and then gear motor "M1" is energized to move the jaws 58 towards the open position for releasing the cut-off shade 16. When the jaws reach the open position, the switch "SW3" returns to its original position as shown in FIG. 8, the red light "R" is deenergized and the gear motor "M1" stops at the end of the automatic cut-off cycle.

The customer is now free to remove the cut-off shade from the apparatus and insert a shade pivot 34 into the cut-off end. A hem slat 38 is snapped off to the desired length and inserted into the hem pocket of the cut-off shade. Even at the end of the cycle, the amber light "Y" continues to remain illuminated indicating that the shade cutter 10 is plugged in or connected to a source of AC power and ready for operation to cut a shade to a selected, measured width.

From the foregoing it will be seen that the automatic shade cutter 10 provides a simple, fast reliable and completely automatic means for cutting stock length shades to a particular width as determined and measured by a customer. All rotating parts are covered and the customer is fully protected therefrom by a removable cover 22. The automatic system requires very little in the way of knowledge or input from a customer and does not require assistance from store personnel or clerks. Selection of a stock shade, measurement and placement of the shade in cutting position is simple, as is initiation of a cut-off cycle by depression of the start switch push button 146, followed by removal of the cut-off shade when the automatic cut-off cycle is completed.

Long knife edge life is provided with the automatic knife indexing system and a cycle counter "C" is (FIG. 8) provided to count the number of operating cycles initiated for providing information on shade inventory and knife edge cutting characteristics.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. Apparatus for automatically cutting elongated articles such as rolled up window shades to a particular width, comprising:

base means supporting operative components of said apparatus at a convenient working level;

clamping means supported from said base means for securing said article in position along a longitudinal axis for cutting;

measuring means extending along said axis outwardly from said clamping means for use in selecting a cutting position of said article for cutting to said particular width;

cutting head means supported from said base means adjacent said clamping means rotatable about said axis including circular knife means rotatably mounted thereon and movable on a plane normal to said axis between a first position outwardly of said article and a second position radially inwardly thereof for cutting engagement with said article while said article is secured in said selected cutting position along said axis, said cutting head means including first means biasing said knife means toward said first position, second means responsive to rotation of said cutting head means for moving said knife means into said second position for cutting said article to said particular width, and third means restraining rotation of said knife means relative to said cutting head means in one direction and permitting free rotation in an opposite direction upon cutting contact with a peripheral cutting edge of said knife means and said article that is secured in said selected cutting position;

and drive means supported from said base means rotatively driving said cutting head means when energized to orbit said knife means around said article secured in said selected cutting position.

2. The apparatus of claim 1 wherein:

said cutting head means includes;

an annular ring having a central aperture in coaxial alignment with said axis for accommodating an article to be cut extending along said axis through said base and cutting plane; and knife support means mounted on said ring for movement toward and away from said axis, said third means supportively interconnecting said knife means and said knife support means.

3. The apparatus of claim 2 wherein:

said second means comprises flyweight means mounted on said ring and connected with said knife support means to move said knife means on said annular ring toward of said article being cut.

4. The apparatus of claim 1 wherein said third means comprises spindle means and a one way over running clutch supporting said circular knife means for relative rotation on said cutting head means in one direction only.

5. Apparatus for automatically cutting elongated articles such as rolled up window shades to a particular width, comprising:

base means supporting operative components of said apparatus at a convenient working level;

clamping means supported from said base means for securing said article in position along a longitudinal axis for cutting;

measuring means extending along said axis outwardly from said clamping means for use in selecting a cutting position of said article for cutting to said particular width;

cutting head means supported from said base means adjacent said clamping means comprising a ring rotatable about said axis including circular knife means rotatably mounted relative to said ring and means restraining rotation of said knife means relative to said cutting head means in one direction and permitting free rotation in an opposite direction upon cutting contact with a peripheral cutting edge of said knife means and said article that is secured in said cutting position; said knife movable on a plane normal to said axis between a first orbital path position outwardly around said article and a second position inwardly thereof for cutting engagement with said article while said article is secured in said selected cutting position along said axis, said cutting head means including means biasing said knife means toward said first position and means responsive to rotation of said cutting head means for moving said knife means into said second position for cutting said article to said particular width, drive means supported from said base means for rotatively driving said cutting head means when energized;

clamp operator means connected to said clamping means for moving said clamping means between an article clamping first position and a second position for releasing said article from clamped engagement, and automatic control circuit means operatively connected to said drive means and said clamp operator means for sequentially controlling said drive means and said clamp operator means including means for detecting the presence of an article in position along said axis ready for cutting; and safety means operatively connected to said automatic control circuit means for preventing operation of said clamp operator and drive means unless the presence of an article is detected.

6. The apparatus of claim 5, wherein:

said automatic control circuit means operatively interconnects said drive means and clamp operator means for activating said clamp operator means to move said clamping means to secure an article is said first clamping position followed by activation of said drive means to drivingly rotate said cutting means to cut said article to said particular width.

7. The apparatus of claim 6 wherein:

said automatic control circuit means includes sensor means operatively connected to said drive means for deactivating said drive means to stop rotation of said cutter head means after said article is cut to width.

8. The apparatus of claim 7 wherein:

said circuit means includes means operatively connected to said clamp operator means for activating said clamp operator means to move said clamping means to said release position after said article is cut.

9. The apparatus of claim 8 including indicator means operatively connected to said automatic control circuit means for indicating when said clamping means is in said clamping position.

10. The apparatus of claim 5 including indexing means on said cutting head means permitting rotation of said circular knife means in one direction about a mounting axis and restraining rotation in an opposite direction.

* * * * *